United States Patent
Ritcher et al.

(10) Patent No.: US 9,945,733 B2
(45) Date of Patent: Apr. 17, 2018

(54) TEMPERATURE MEASUREMENT AT HIGH-VOLTAGE POTENTIAL

(71) Applicant: Siemens Aktiengesellschaft, Munich (DE)

(72) Inventors: Markus Ritcher, Jena (DE); Michael Willsch, Jena (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 244 days.

(21) Appl. No.: 14/895,086

(22) PCT Filed: May 16, 2014

(86) PCT No.: PCT/EP2014/060039
§ 371 (c)(1),
(2) Date: Dec. 1, 2015

(87) PCT Pub. No.: WO2014/195109
PCT Pub. Date: Dec. 11, 2014

(65) Prior Publication Data
US 2016/0109302 A1     Apr. 21, 2016

(30) Foreign Application Priority Data

Jun. 4, 2013     (DE) .................. 10 2013 210 297

(51) Int. Cl.
*G01K 1/00*     (2006.01)
*G01J 5/00*     (2006.01)
(Continued)

(52) U.S. Cl.
CPC .............. *G01K 7/22* (2013.01); *G01K 7/203* (2013.01); *G01K 7/245* (2013.01); *G01K 13/00* (2013.01); *G01K 2215/00* (2013.01)

(58) Field of Classification Search
USPC .............................. 374/131, 120, 183, 152
See application file for complete search history.

(56) References Cited

U.S. PATENT DOCUMENTS

| | | | |
|---|---|---|---|
| 4,346,478 A | 8/1982 | Sichling | 398/107 |
| 5,008,525 A | 4/1991 | Petronio | 250/214 C |

(Continued)

FOREIGN PATENT DOCUMENTS

| | | | |
|---|---|---|---|
| CN | 101692401 A | 4/2010 | G01R 15/18 |
| CN | 103116055 A | 5/2013 | G01K 11/32 |

(Continued)

OTHER PUBLICATIONS

German Office Action, Application No. 102013210297.6, 5 pages, dated Feb. 14, 2014.

(Continued)

*Primary Examiner* — Mirellys Jagan
(74) *Attorney, Agent, or Firm* — Slayden Grubert Beard PLLC

(57) ABSTRACT

An arrangement for temperature measurement at high-voltage potential is disclosed. The energy for measuring the temperature of an optical current transformer is provided by a single photodiode. The photodiode is supplied by light emitted by a light source and guided to the photodiode via an optical waveguide.

16 Claims, 1 Drawing Sheet

(51) Int. Cl.
G01K 7/22 (2006.01)
G01K 7/20 (2006.01)
G01K 7/24 (2006.01)
G01K 13/00 (2006.01)

(56) References Cited

U.S. PATENT DOCUMENTS

| | | | | |
|---|---|---|---|---|
| 5,223,707 | A | 6/1993 | Bjork | 250/227.21 |
| 5,796,890 | A | 8/1998 | Tsuji et al. | 385/24 |
| 7,377,689 | B2* | 5/2008 | Balan | G01K 7/42 374/152 |
| 2004/0190811 | A1 | 9/2004 | Winfield et al. | 385/12 |
| 2006/0215730 | A1* | 9/2006 | Meilleur | G01K 11/3213 374/152 |
| 2006/0251147 | A1* | 11/2006 | Balan | G01K 1/14 374/152 |
| 2011/0052115 | A1 | 3/2011 | Lee et al. | 385/12 |
| 2011/0060544 | A1 | 3/2011 | Wu et al. | 702/107 |
| 2012/0266803 | A1 | 10/2012 | Zediker et al. | 114/337 |

FOREIGN PATENT DOCUMENTS

| | | | |
|---|---|---|---|
| DE | 4443646 A1 | 6/1996 | G01K 1/20 |
| DE | 10047225 C1 | 6/2002 | G01K 1/14 |
| DE | 19802191 B4 | 12/2004 | G01K 15/24 |
| DE | 112010003387 T5 | 6/2012 | G01K 15/24 |
| EP | 0290243 A2 | 11/1988 | G01D 21/00 |
| JP | 2010071934 A | 4/2010 | G01R 15/24 |
| WO | 2011/025573 A1 | 3/2011 | G01R 19/32 |
| WO | 2014/195109 A1 | 12/2014 | G01K 7/20 |

OTHER PUBLICATIONS

International Search Report and Written Opinion, Application No. PCT/EP2014/060039, 12 pages, dated Nov. 5, 2014.

* cited by examiner

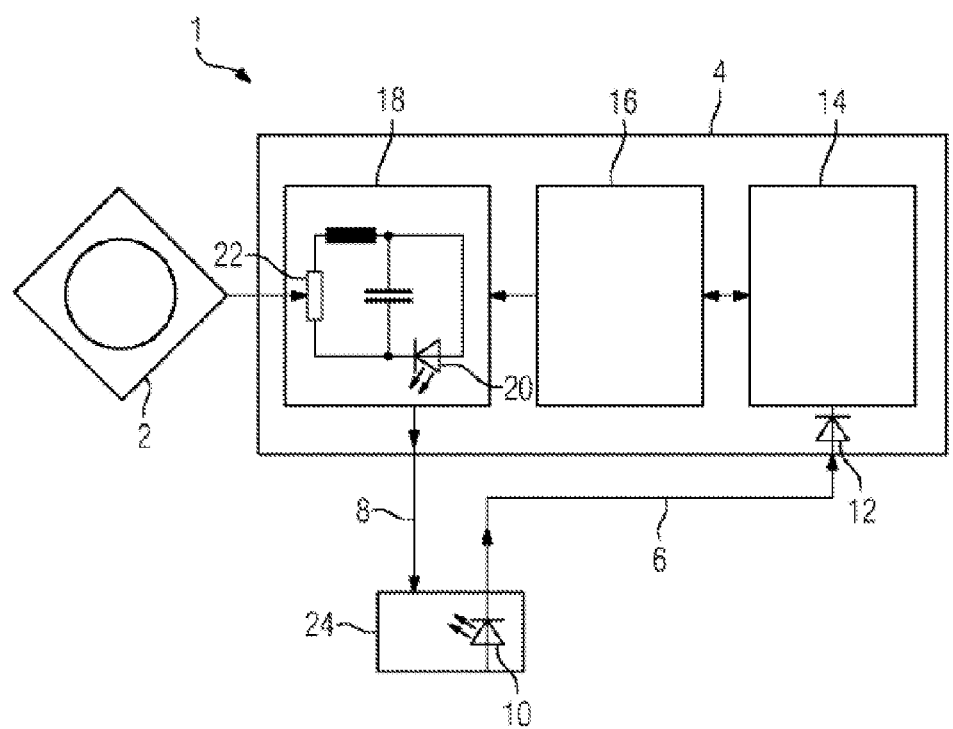

TEMPERATURE MEASUREMENT AT HIGH-VOLTAGE POTENTIAL

CROSS-REFERENCE TO RELATED APPLICATIONS

This application is a U.S. National Stage Application of International Application No. PCT/EP2014/060039 filed May 16, 2014, which designates the United States of America, and claims priority to DE Application No. 10 2013 210 297.6 filed Jun. 4, 2013, the contents of which are hereby incorporated by reference in their entirety.

TECHNICAL FIELD

The invention relates to an arrangement for temperature measurement at high-voltage potential with an electronic temperature sensor which measures the temperature of an optical current transformer and which is supplied with electrical energy via a light source.

BACKGROUND

Optical current transformers have been known for a long time. Generally, a current transformer is understood to be a measuring transducer having a sensor head for potential-free measurement of alternating currents. Optical current transformers make use of the Faraday effect for measurement. The Faraday effect describes the rotation of the polarization of a linearly polarized electromagnetic wave upon passing through a transparent medium to which a magnetic field that is constant over time is applied parallel to the direction of propagation of the wave.

Optical current transformers are increasingly being used at high-voltage potential as well. Such an optical current transformer is known from DE 198 02 191 B4, for example.

The Faraday effect is generally temperature-dependent since the rotation of the polarized wave is dependent on the material properties of the transparent medium, and said properties change with temperature. If the temperature dependence is not taken into account during the evaluation of the measurement, then this can lead to measurement errors in the case of the measurement values determined for the altering current. In order to compensate for such measurement errors, an additional temperature measurement at high-voltage potential is carried out according to the prior art. In this case, the measurement of the temperature can be carried out both electronically and optically.

Optical temperature sensors are for example sensors on the basis of fiber Bragg gratings. Sensors having semiconductor elements which function as temperature-dependent optical band-edge filters or sensors which utilize the temperature-dependent decay time of the fluorescence of crystals are also known. The disadvantage of optical temperature sensors resides in their higher complexity in comparison with electronic sensors.

According to the prior art, electronic temperature sensors are digital sensors which are implemented by means of microprocessors. Such temperature sensors based on digital signal processing require a high operating voltage in the range of a few volts.

Moreover, they have to be continuously supplied with enough electrical energy.

In order to cover the demand for electrical energy, sensors which are supplied with energy by means of an optical waveguide in order to fulfill the measurement task are known in the case of digital measurement of the temperature at high-voltage potential. In this case, light of a powerful laser is guided from a ground station by means of the optical waveguide to the optical current transformer. Powerful lasers having a power in the range of 100 mW to 500 mW are typically used in order to provide enough energy for the digital temperature measurement. Within the current transformer or the temperature sensor there is an arrangement consisting of a plurality of photoreceivers which convert the light of the laser into electrical energy for the operation of the digital temperature sensor. After the measurement task has been fulfilled, the measurement signal is passed back to the ground station via a further optical waveguide. On account of the great high optical power of the lasers used, a sufficient operating safety must always be ensured.

SUMMARY

One embodiment provides an arrangement for measuring the temperature at high-voltage potential, comprising an optical current transformer at high-voltage potential, an electronic temperature sensor for measuring the temperature of the current transformer, a first optical waveguide for the energy supply of the electronic temperature sensor, a second optical waveguide for the data transmission of the measurement signal of the electronic temperature sensor to a ground station, and a first light source, wherein the electronic temperature sensor comprises exactly one photodiode and the first optical waveguide is designed for guiding light from the light source to the photodiode.

In a further embodiment, the temperature sensor is designed as an electrical resonant circuit wherein the resonant circuit comprises a temperature-dependent resistor.

In a further embodiment, the resonant circuit comprises a second light source, in particular an LED.

In a further embodiment, the electronic temperature sensor comprises at least one energy store for storing electrical energy.

In a further embodiment, the light power of the first light source is less than or equal to 5 mW, in particular less than or equal to 1 mW.

In a further embodiment, the first light source is an LED.

In a further embodiment, the temperature sensor is integrated within a sensor head of the current transformer.

In a further embodiment, the first and second optical waveguides are designed as standard multimode fibers.

BRIEF DESCRIPTION OF THE DRAWINGS

Example aspects of the invention are described below with reference to FIG. 1, which shows an arrangement for the analog temperature measurement of an optical current transformer at high-voltage potential, according to an example embodiment.

DETAILED DESCRIPTION

Embodiments of the present invention provide an arrangement for an optical current transformer at high-voltage potential with an electronic temperature measurement in which the temperature sensor is constructed in a simple manner, functions reliably and in which the electronic temperature measurement has a low energy demand.

Some embodiments provide an arrangement for measuring the temperature at high-voltage potential that comprises an optical current transformer at high-voltage potential, an electronic temperature sensor for measuring the temperature of the current transformer, exactly one photodiode, a first optical waveguide for guiding light from a first light source to the photodiode, and a second optical waveguide for transmitting the measurement signal to a ground station.

In some embodiments, the energy necessary for the operation of the electronic temperature sensor is made available by the one photodiode. Light guided by the first optical waveguide from the first light source to the photodiode is advantageously used for the energy supply. The use of exactly one photodiode enables the construction to be fashioned in a simple manner since the number of components is reduced.

In one embodiment, the electronic temperature sensor is a resonant circuit having a temperature-dependent resistor. The natural frequency/resonant frequency of the resonant circuit is dependent on the damping thereof, which is dominated by the temperature-dependent resistor. In general, the natural frequency of a resonant circuit decreases as the damping increases. If the resistance of the temperature-dependent resistor changes as a result of the temperature of the current transformer, then the natural frequency is shifted. Consequently, the natural frequency is a measure of the temperature.

What is particularly advantageous about the analog embodiment mentioned is that it requires a low energy demand in comparison with digital measurements. The demand for electrical energy can thus be covered by the one photodiode.

In one embodiment, a second light source, in particular an LED, is fitted within the electrical circuit of the resonant circuit. As a result, the second light source periodically emits light with a frequency that corresponds to the natural frequency of the resonant circuit. The natural frequency of the resonant circuit is dependent on the temperature, such that the frequency of the second light source represents an analog measure of the measured temperature. The analog optical signal of the second light source can then be transmitted via the second optical waveguide to the ground station.

Advantageously, the electronic temperature sensor has an energy store for storing electrical energy. The light of the first light source is guided from the light source to the photodiode, which uses this light to generate electrical energy. The electrical energy generated by the photodiode is advantageously stored in the energy store. As a result, the first light source can be designed as a low-power light source. In one advantageous embodiment, the energy store is a capacitor or an accumulator, a capacitor being particularly advantageous. It is particularly advantageous that the capacitor enables a temperature measurement at time intervals. As a result, the consumption of electrical energy decreases since one measurement per minute, for example, is sufficient for the temperature measurement.

In one development, the light power of the first light source is less than or equal to 5 mW. A power of less than or equal to 1 mW is particularly advantageous. As a result, the temperature sensor can be supplied by a low power level. If the low power does not suffice for fulfilling the measurement task, then storage in the energy store can advantageously be carried out until enough energy is available. It is expedient to use a laser in the visible range from 400 nm to 700 nm as the first light source. If the power of the laser used is less than 1 mW, then the laser is associated with the second laser protection class. Therefore, no special precautionary measures need be taken. As a result, the construction and also the handling can be significantly simplified.

In one embodiment, the first light source is designed as an LED. It is particularly advantageous that the latter are cost-effective and nevertheless provide enough energy for supplying the temperature sensor or for filling the energy store.

The temperature sensor can be integrated within the optical current transformer. Advantageously in direct proximity to the sensor head of the current transformer. As a result, the temperature dependence of the Faraday effect can be compensated for significantly better.

In one development, the temperature sensor uses already existing optical waveguides of the optical current transformer.

The first and second optical waveguides of the temperature sensor can be standard multimode optical waveguides. In particular, optical waveguides having core diameters in the range of 50 µm to 62 µm can be used. Even with such small diameters of the core, enough energy for the operation of the temperature sensor according to the invention can still be provided.

FIG. 1 shows an arrangement 1 for temperature measurement at high-voltage potential, which comprises an optical current transformer 2, an electronic temperature sensor 4, a first and second optical waveguide 6, 8 and a first light emitting diode 10, which is situated within a ground station 24. Furthermore, the temperature sensor 4 comprises exactly one photodiode 12, a capacitor 14, a control unit 16 and a resonant circuit 18. In addition, a second LED 20 and a temperature-dependent resistor 22 are situated within the electrical circuit of the resonant circuit 18. In this case, the resistor 22 can be for example a thermistor, a PT100, a thermoelement or else a semiconductor sensor.

Light of the first light emitting diode 10 is guided via the first optical waveguide 6 to the photodiode 12 within the electronic temperature sensor 4. Preferably, the optical waveguides 6, 8 can be standard multimode optical waveguides or 200/220 µm hard cladding silica optical waveguides. Standard multimode optical waveguides having a core diameter of 50 µm or 62 µm are particularly advantageous. The first light emitting diode 10 has a low power of less than or equal to 5 mW. A power of less than or equal to 1 mW is particularly advantageous. This low power typically does not suffice for the measurement of the temperature of the optical current transformer 2, such that the electrical energy generated in the photodiode 12 is stored in the capacitor 14 for a time period determined by the control unit 16. The first light emitting diode 10 is operated continuously during the filling of the capacitor 14. The control unit 16 stipulates when the stored electrical energy suffices for fulfilling the measurement task, and then makes available to the resonant circuit 18 the electrical energy stored in the capacitor 14 for the purpose of measuring the temperature. By way of example, one discharge of the capacitor 14 per minute is sufficient.

The analog and thus energy-saving processing of the temperature measurement by means of the resonant circuit 18 is particularly advantageous. The natural frequency of the resonant circuit 18 is dependent on the temperature-dependent resistor 22. The second LED 20 is operated with the voltage of the resonant circuit 18. As a result, it emits light periodically with the temperature-dependent natural frequency of the resonant circuit 18. The frequency of the second LED 20 is therefore a measurement of the temperature of the current transformer 2. The periodic light of the second LED 20 is then subsequently communicated to the ground station 24 by means of the second optical waveguide 8.

If the measurement of the temperature is realized digitally by the use of microprocessors, then the voltage of the photodiode 12 typically does not suffice for fulfilling the measurement task. It is therefore expedient to use a step-up converter for increasing the voltage.

Generally, the measurement signal of the temperature can also be guided as a pulse-width-modulated optical signal to the ground station 24 by means of the second optical waveguide 8.

What is claimed is:

1. A device for measuring a temperature at a high-voltage potential, comprising:
   an optical current transformer at a high-voltage potential,
   an electronic temperature sensor configured to measure a temperature of the current transformer, the electronic temperature sensor having exactly one photodiode,
   a first light source configured to emit light,
   a first optical waveguide configured to guide light emitted by the first light source to the photodiode of the electronic temperature sensor,
   a second optical waveguide configured to transmit data indicating the temperature measured by the electronic temperature sensor to a ground station.

2. The device of claim 1, wherein the temperature sensor is designed as an electrical resonant circuit wherein the resonant circuit comprises a temperature-dependent resistor.

3. The device of claim 1, wherein the device further comprises a second light source comprising an LED.

4. The device of claim 1, wherein the electronic temperature sensor comprises at least one energy store configured to store electrical energy.

5. The device of claim 1, wherein a light power of the light emitted by the first light source is less than or equal to 5 mW.

6. The device of claim 1, wherein the first light source is an LED.

7. The device of claim 1, wherein the temperature sensor is integrated within a sensor head of the optical current transformer.

8. The device of claim 1, wherein the first and second optical waveguides comprise multimode fibers.

9. A method for measuring a temperature at a high-voltage potential, comprising:
   using an electronic temperature sensor having exactly one photodiode to measure a temperature of a current transformer at a high-voltage potential,
   operating a first light source to emit light, wherein the light emitted by the first light source is guided to the photodiode of the electronic temperature sensor by a first optical waveguide, and
   using a second optical waveguide to transmit data indicating the temperature measured by the electronic temperature sensor to a ground station.

10. The method of claim 9, wherein the temperature sensor is designed as an electrical resonant circuit wherein the resonant circuit comprises a temperature-dependent resistor.

11. The method of claim 9, wherein the device further comprises a second light source comprising an LED.

12. The method of claim 9, further comprising storing electrical energy in at least one energy store of the electronic temperature sensor.

13. The method of claim 9, wherein a light power of the light emitted by the first light source is less than or equal to 5 mW.

14. The method of claim 9, wherein the first light source is an LED.

15. The method of claim 9, wherein the temperature sensor is integrated within a sensor head of the optical current transformer.

16. The method of claim 9, wherein the first and second optical waveguides comprise multimode fibers.

* * * * *